(12) United States Patent
Peron

(10) Patent No.: US 6,400,588 B1
(45) Date of Patent: Jun. 4, 2002

(54) NON-ISOLATED A.C./D.C. CONVERTER

(75) Inventor: Benoît Peron, Tours (FR)

(73) Assignee: STMicroelectronic S.A., Gentilly (FR)

( * ) Notice: Subject to any disclaimer, the term of this patent is extended or adjusted under 35 U.S.C. 154(b) by 0 days.

(21) Appl. No.: 09/628,052

(22) Filed: Jul. 28, 2000

(30) Foreign Application Priority Data

Jul. 30, 1999 (FR) .......................................... 99 10088

(51) Int. Cl.$^7$ ........................... H02M 7/02; H02M 7/25
(52) U.S. Cl. ......................................... 363/63; 363/60
(58) Field of Search ............................. 363/59, 60, 63

(56) References Cited

U.S. PATENT DOCUMENTS

| | | | |
|---|---|---|---|
| 3,938,025 A | | 2/1976 | Gustafsson ................... 321/2 |
| 4,807,104 A | * | 2/1989 | Floyd et al. .................. 363/59 |
| 4,812,961 A | | 3/1989 | Essaff et al. .................. 363/61 |
| 5,051,882 A | * | 9/1991 | Grimm et al. ................ 363/60 |
| 5,159,543 A | * | 10/1992 | Yamawaki ................... 363/60 |
| 5,262,934 A | * | 11/1993 | Price ............................ 363/60 |
| 5,306,954 A | * | 4/1994 | Chan et al. ................. 307/110 |
| 5,461,557 A | * | 10/1995 | Tamagawa ................... 363/60 |
| 5,463,542 A | * | 10/1995 | Okamoto ..................... 363/60 |
| 5,606,491 A | | 2/1997 | Ellis ............................. 363/60 |
| 5,896,284 A | | 4/1999 | Murasato et al. ........... 363/124 |

FOREIGN PATENT DOCUMENTS

| | | | |
|---|---|---|---|
| DE | 33 41 767 A | 5/1985 | ............ H02M/3/04 |
| EP | 0 601 593 | 6/1994 | ............ H02M/3/07 |

OTHER PUBLICATIONS

French Search Report from French Patent Application 99 10088, filed Jul. 30, 1999.
Patent Abstracts of Japan, vol. 17, No. 668 (E–1473), Dec. 9, 1993 & JP–A–05 219738 (Matsushita Electric) Aug. 27, 1993.

* cited by examiner

*Primary Examiner*—Bao Q. Vu
(74) *Attorney, Agent, or Firm*—Wolf, Greenfield & Sacks, P.C.; James H. Morris

(57) ABSTRACT

A converter receiving an A.C. voltage between an input terminal and a reference terminal and providing two D.C. voltages of opposite polarities across a first and a second capacitor. The converter includes a first switch connected the input terminal and a node of the circuit; a third capacitor, connected in parallel with the first capacitor, between the node and the reference terminal; circuitry including a second switch for connecting, in series, the second capacitor and the third capacitor when the second switch is closed; and a control circuit for closing the first switch only at the beginning and at the end of halfwaves of given polarity, the first switch being open when the second switch is closed.

28 Claims, 3 Drawing Sheets

NON-ISOLATED A.C./D.C. CONVERTER

BACKGROUND OF THE INVENTION

1. Field of the Invention

The present invention relates to non-isolated power supplies for supplying a low D.C. voltage from a high A.C. voltage. Such power supplies, also called power converters, can be found in most electric household appliances, for example, washing machines, for the supply of low voltage circuits such as, for example, logic circuits (microprocessors, programmable logic), control circuits of electromechanical actuators (relays) or electronic actuators (triacs), etc . . .

The present invention more specifically relates to converters intended for providing two D.C. voltages, one of which is positive and the other one of which is negative with respect to a reference point also forming a reference for the A.C. power supply.

2. Discussion of the Related Art

FIG. 1 shows a first example of a conventional AC/DC converter with positive and negative outputs. This converter uses a transformer T, the primary winding L1 of which receives on two terminals E1 and E2 an A.C. voltage Vac (for example, mains 240 V/50 Hz or 110 V/60 Hz). The two terminals of secondary L2 of transformer T provide a low A.C. voltage Vi, the peak amplitude of which approximately corresponds to the values desired for output voltages V+ and V− of the converter. Each output voltage V+, V− is sampled across a capacitor, respectively C1, C2. Each capacitor is connected, in series with a diode, respectively D1, D2, to secondary winding L2 of the transformer. The anode of diode D1 and the cathode of diode D2 are connected to the high terminal of winding L2. The common node M of capacitors C1 and C2, which is the reference of voltages V+ and V−, is connected to input terminal E2.

FIG. 2 shows a second conventional example of an AC/DC converter adapted to providing two output voltages V+ and V− of opposite signs. A high voltage capacitor Cx is connected via a resistor R of small value to input terminal E1. The second terminal of capacitor Cx is connected via rectifying diodes D1, D2 to low voltage capacitors C1 and C2, the second terminals of which are connected to a reference terminal M connected to terminal E2. A Zener diode DZ1, DZ2, is connected in parallel on each of capacitors C1, C2. Capacitor Cx has a small value as compared to that of each of capacitors C1, C2, to provide a high impedance to the variations of the input voltage.

The above-described converters are relatively simple to form due to the small number of components used. However, these converters have the major disadvantage of being bulky and expensive.

For the converter of FIG. 1, the high cost and the large bulk are due to the transformer. Further, non-negligible losses appear even in the absence of any flow (iron losses of the transformer).

For the converter of FIG. 2, the cost and the bulk are due to the capacitor that must withstand the voltage of the supply system. This converter further generates non-negligible losses.

SUMMARY OF THE INVENTION

The present invention provides a novel solution to make a converter from a high A.C voltage into two symmetrical low D.C. voltages, which overcomes the disadvantages of known solutions.

The present invention aims, in particular, at providing a novel solution with a reduced or minimized bulk.

The present invention also aims at a solution that respects electromagnetic compatibility constraints.

The present invention also provides a novel converter that automatically adapts to the current demand of the load. More specifically, the present invention provides a solution adapted to a large range of currents, that is, which enables, if necessary, providing substantially larger currents than conventional solutions, without generating significant losses.

The present invention further aims at improving the regulation of the converter output voltage.

To achieve these and other objects, the present invention provides a converter receiving an A.C. voltage between an input terminal and a reference terminal and providing two D.C. voltages of opposite polarities across a first and a second capacitor, a common terminal of which is connected to the reference terminal. This converter includes a first one-way switch connected between the input terminal and a node of the circuit; a third capacitor, connected in parallel with the first capacitor, between said node and the reference terminal; circuit means including a second switch for connecting the second capacitor in series with the third capacitor when the second switch is closed; and a control circuit for closing the first switch only at the beginning and at the end of halfwaves of given polarity, the second switch being open when the first switch is closed.

According to an embodiment of the present invention, the circuit means include a controllable current source to ensure the supply of a constant current.

According to an embodiment of the present invention, the second switch is connected between said node and the reference terminal.

According to an embodiment of the present invention, the first capacitor is connected to said node via a first diode, the third capacitor being connected via a third diode to the reference terminal.

According to an embodiment of the present invention, a second diode is connected between the second capacitor and the junction point of the third capacitor and of the third diode.

According to an embodiment of the present invention, the control circuit receives an information about the D.C. voltage across the first capacitor and controls the first switch so that this D.C. voltage is substantially constant.

According to an embodiment of the present invention, the first switch is controllable in voltage or current to be turned off or on and is able to block the mains voltage forwardly or in reverse when it is not controlled to the on state.

The foregoing objects, features and advantages of the present invention will be discussed in detail in the following non-limiting description of specific embodiments in connection with the accompanying drawings.

DETAILED DESCRIPTION

Figure 1:
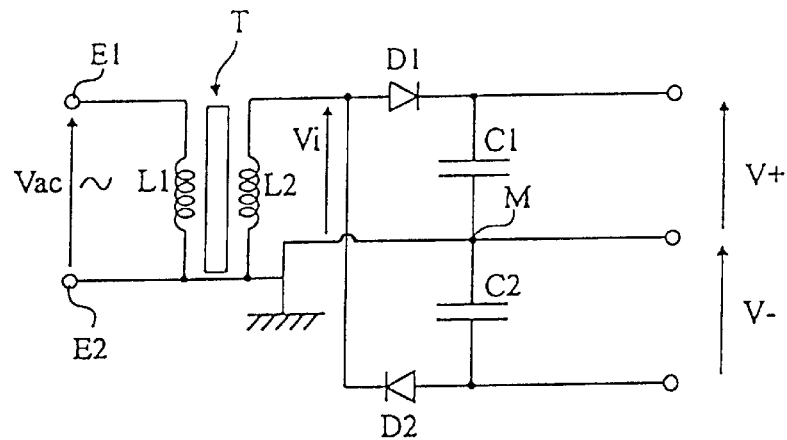
FIGS. 1 and 2, previously described, are meant to show the state of the art and the problem to solve.
Figure 2:
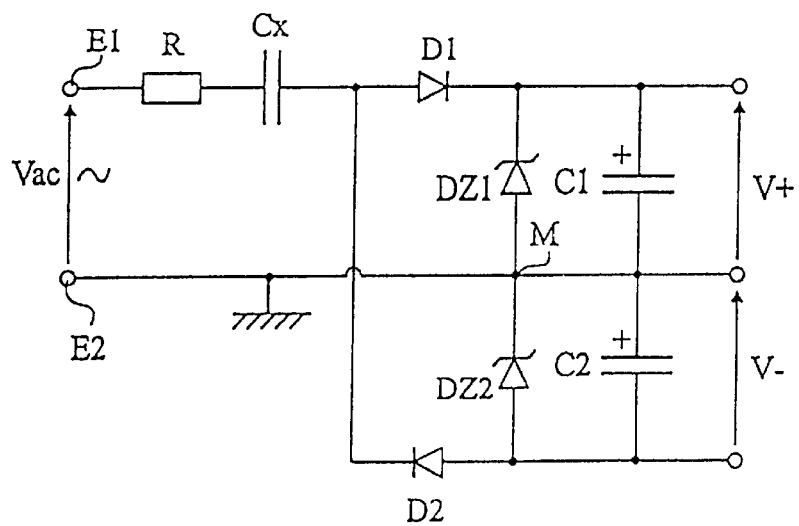

The same elements have been designated with the same references in the different drawings. For clarity, only those elements that are necessary to the understanding of the present invention have been shown in the drawings and will be described hereafter.

Figure 3A:
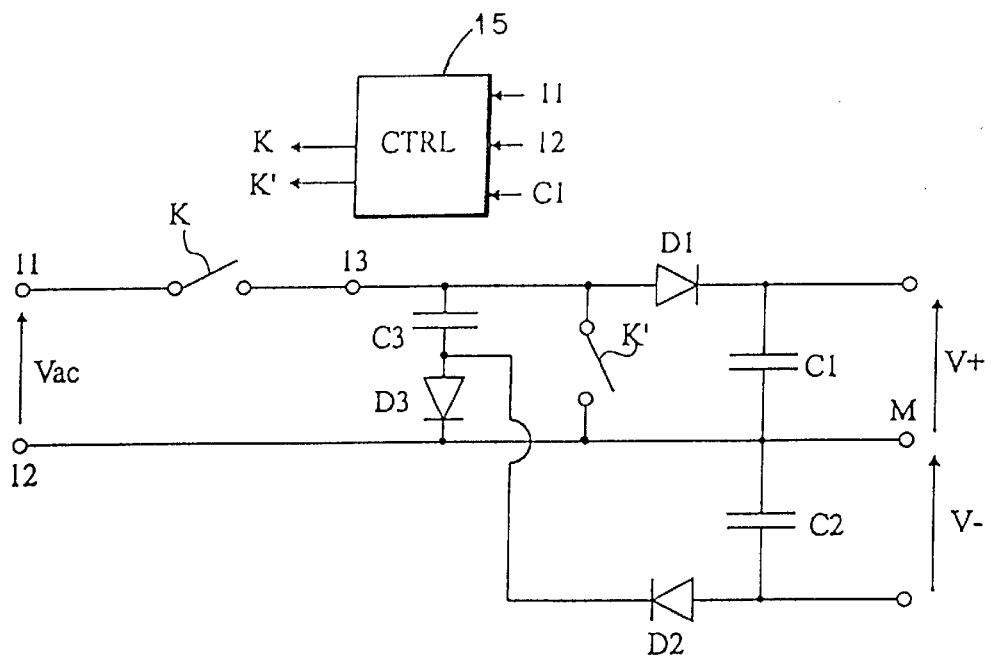
FIGS. 3A and 3B very schematically show an embodiment of an AC/DC converter according to the present invention.

As schematically illustrated in FIG. 3A, a converter according to the present invention receives on two input terminals 11 and 12 an A.C. voltage, terminal 12 forming a reference terminal. D.C. output voltages V+ and V−, respectively positive and negative, are available across capacitors C1 and C2 that have a common terminal M forming the reference terminal of the converter, connected to terminal 12.

A one-way switch K is connected by its anode to a terminal 11 and by its cathode to a terminal 13. Between terminals 13 and 12 are arranged in parallel, capacitor C1 in series with a diode D1, and a capacitor C3 in series with a diode D3. Diodes D1 and D3 are biased to be conductive when terminal 13 is positive with respect to terminal 12. The anode of diode D1 is connected to terminal 13. The cathode of diode D3 is connected to terminal 12. A diode D2 is connected by its anode to the terminal of capacitor C2 that is not connected to node M and by its cathode to the junction point of capacitor C3 and of diode D3. A switch K' is connected between terminals 13 and 12.

Switches K and K' are controlled by a control circuit 15 (CTRL) that is connected to terminals 11 and 12, from which it receives its power supply and an information about the A.C. input voltage. Control circuit 15 also receives (to regulate the value of the output voltage) an information about the voltage present across capacitor C1.

Figure 4A:
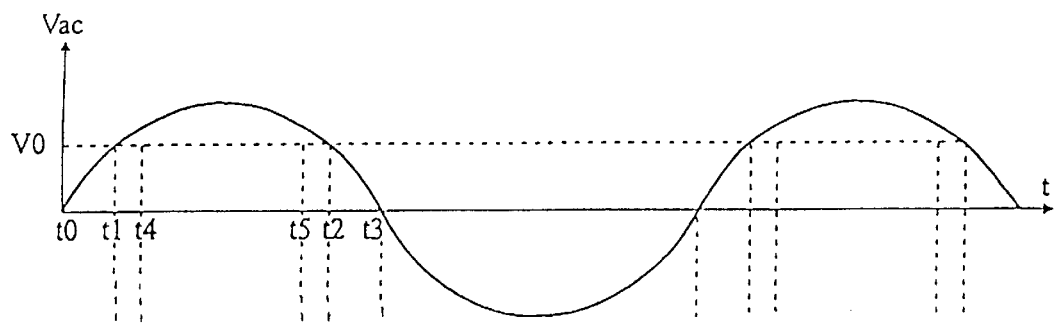
FIGS. 4A to 4D illustrate, in the form of timing diagrams, the operation of a converter according to the present invention.
Figure 4B:
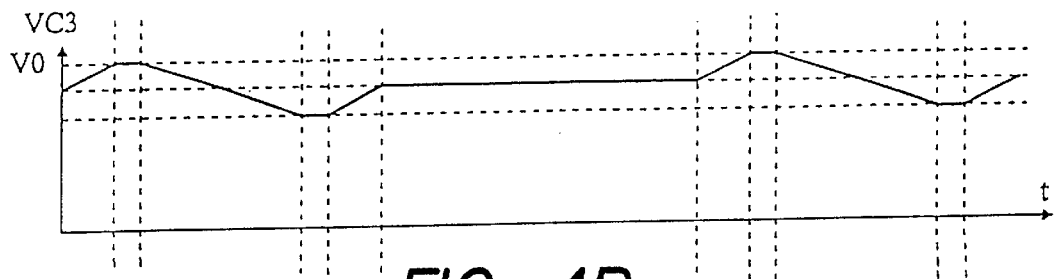
Figure 4C:
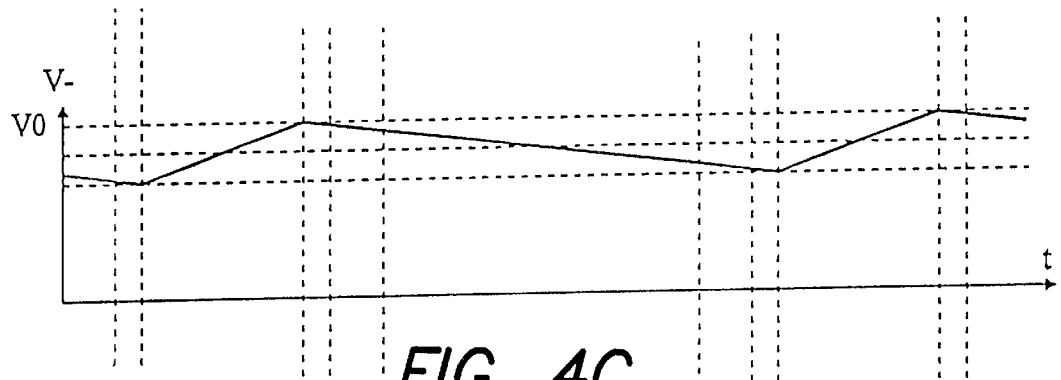
Figure 4D:
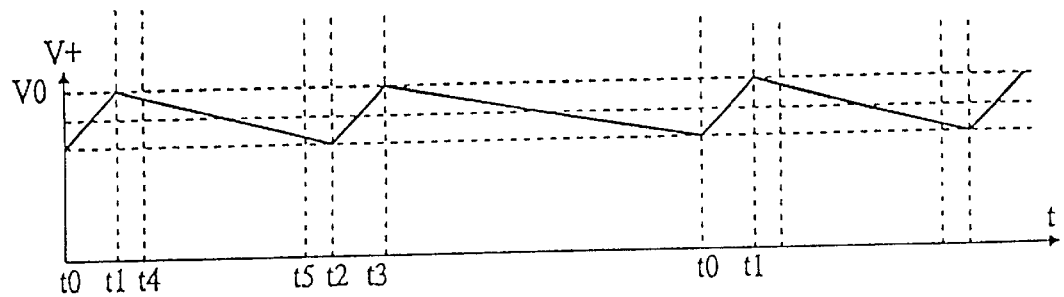

The operation of a converter according to the present invention will be described in relation with FIGS. 4A to 4D. These drawings show, in the form of timing diagrams, an example of shape of the voltages characteristic of the converter according to the present invention. FIG. 4A shows A.C. voltage Vac. FIG. 4B shows voltage VC3 across capacitor C3. FIG. 4C shows output voltage V− across capacitor C2. FIG. 4D shows output voltage V+ across capacitor C1. For simplification and unless otherwise mentioned, no account will be taken of the voltage drops in the circuit diodes.

The following discussion of the operation of the converter of the present invention relates to a steady state, and the transient state of initial charge of capacitors C1 and C2 can be deduced from this operation by taking into account the fact that the voltage levels can take several halfwaves before being reached.

According to the present invention, circuit 15 controls switch K so that it is only closed at the beginning and at the end of each positive halfwave of voltage Vac, during periods t0–t1 at halfwave beginnings and t2–t3 at halfwave ends. Switch K' is open during these periods.

Between times t0 and t1, diodes D1 and D3 are forward biased. Accordingly, the current flowing through switch K charges capacitor C1 (FIG. 4D) as well as capacitor C3 (FIG. 4B). However, capacitor C2 continues its discharges into the load (not shown) connected thereacross (FIG. 4C).

At time t1, circuit 15 turns off switch K after detecting that voltage V+ has reached the desired value V0. Capacitor C1 starts discharging as it provides voltage V+ to a load. The load supply power is then provided by capacitors C1 and C2. The supply voltage across capacitor C3 however remains constant between t1 and t4 and between t5 and t2.

At a time t4 slightly subsequent to time t1, circuit 15 turns switch K' on. This results in a discharge of capacitor C3 into capacitor C2 by path C3, K', C2, D2. Thus, the voltages across capacitors C2 and C3 are balanced. Preferably, a circuit (not shown in FIG. 3A) adapted to ensuring a constant current discharge is provided in series with switch K'.

The turn-on delay of switch K' with respect to the turning-off of switch K (times t1 to t4) aims at avoiding any risk of simultaneous conduction of these switches, which would result in short-circuiting the A.C. power supply. For the same reason, switch K' is turned off, in the vicinity of the end of the halfwave, at a time t5 prior to time t2 of turning-on of switch K.

From time t2 to time t3 corresponding to the end of the halfwave, capacitors C1 and C3 complete their respective charges.

During negative halfwaves, between times t3 and t0, capacitors C1 and C2 supply the loads not shown that are connected to them, switch K being off and switch K' being optionally off or on.

For simplification, the loads have been assumed to be purely resistive. The converter of the present invention is however not limited to such loads.

It should be noted that, since circuit 15 has the function of regulating the current sampled by switch K from the A.C. power supply, to maintain a voltage V+=V0 at each end of a charge period at the beginning of a halfwave (time t1), the converter of the present invention is well adapted to a variation of the power required by one of the loads.

Figure 3B:
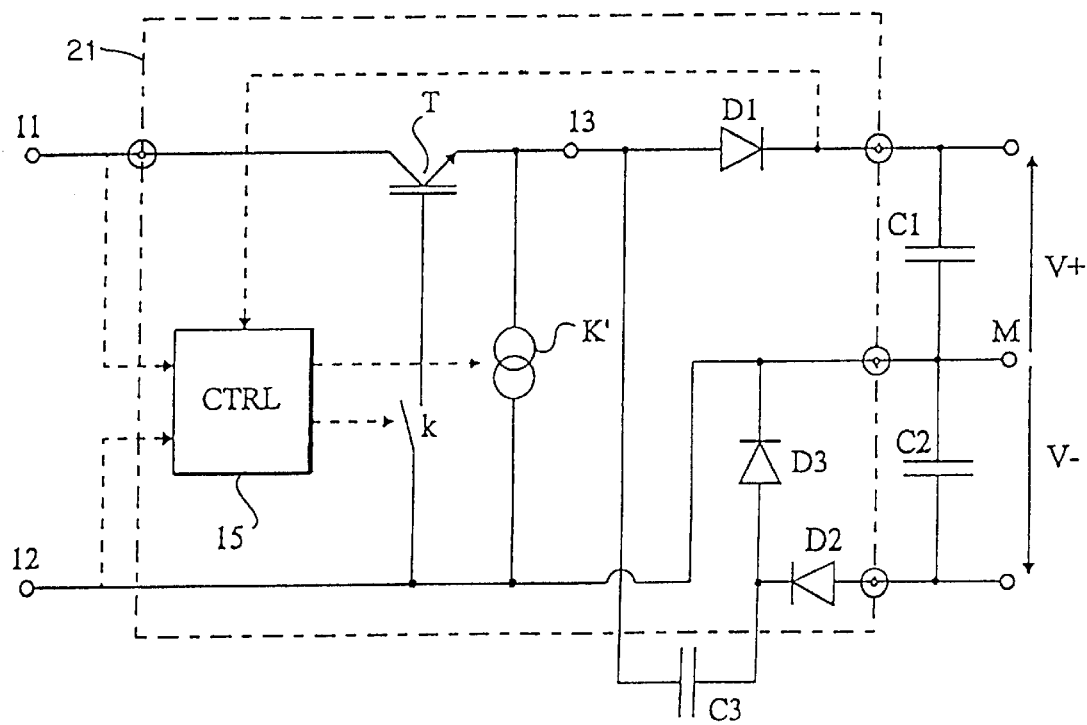

FIG. 3B shows the same circuit as FIG. 3A. The elements have been arranged so that all the components belonging to the same silicon chip are arranged within a frame 21. The only non-integrated elements then are capacitors C1, C2, and C3. Switch K has been shown in the form of a component T such as an insulated gate bipolar transistor (IGBT) associated with a gate switch k. Generally, component T is a switch letting through the current in a single direction, controllable in voltage or current to be turned off or on, able to block the mains voltage in reverse, and forwardly when it is not on. Switch K' has been shown in the form of a current source controlled to be blocked or active.

An advantage of the present invention is that no current is sampled from the A.C. power supply except in the vicinity of the zero crossing of a halfwave. The present invention thus reduces or minimizes the dissipated power of the circuit by limiting the periods of energy sampling from the mains to the zero crossing of the halfwaves and avoids the generation of large current pulses upon turning-off and turning-on of switch K.

Another advantage of the present invention is not to require the use of high-voltage passive power components.

Another advantage of the present invention is that output voltages V+ and V− are regulated with respect to neutral 12 of A.C. voltage Vac.

Of course, the present invention is likely to have various alterations, modifications, and improvements which will readily occur to those skilled in the art. Further, although the present invention has been described hereabove in relation with a switch K operating in halfwaves, a fullwave rectification may be performed upstream by means of a diode bridge.

Such alterations, modifications, and improvements are intended to be part of this disclosure, and are intended to be within the spirit and the scope of the present invention.

Accordingly, the foregoing description is by way of example only and is not intended to be limiting. The present invention is limited only as defined in the following claims and the equivalents thereto.

What is claimed is:

1. A converter receiving an A.C. voltage between an input terminal and a reference terminal and providing two D.C. voltages of opposite polarities across a first and a second capacitor, a common terminal of which is connected to the reference terminal, including:
   a first one-way switch connected between the input terminal and a node of the converter;
   a third capacitor, connected in parallel with the first capacitor, between said node and the reference terminal;
   circuit means including a second switch for connecting the second capacitor in series with the third capacitor when the second switch is closed; and
   a control circuit for closing the first switch only at a beginning and at an end of halfwaves of a given polarity of said A.C. voltage, the second switch being open when the first switch is closed.

2. The converter of claim 1, wherein the circuit means include a controllable current source for flowing a constant current.

3. The converter of claim 1, wherein the second switch is connected between said node and the reference terminal.

4. The converter of claim 1, wherein the first capacitor is connected to said node via a first diode, the third capacitor being connected via a third diode to the reference terminal.

5. The converter of claim 4, wherein a second diode is connected between the second capacitor and a junction point of the third capacitor and of the third diode.

6. The converter of claim 1, wherein the control circuit receives information about the D.C. voltage across the first capacitor and controls the first switch so that the D.C. voltage across the first capacitor is substantially constant.

7. The converter of claim 1, wherein the first switch is controllable by voltage or current to be turned off or on and is able to block the main voltage forwardly or in reverse when said first switch is not controlled to the on state.

8. A converter capable of receiving an A.C. voltage, comprising:
   a first switch connected between an input terminal and a node of the converter;
   a third capacitor, connected in parallel with a first capacitor, between the node and a reference terminal;
   a second switch connecting a second capacitor in series with the third capacitor when the second switch is closed; and
   a control circuit for closing the first switch during a first portion and a second portion of a halfwave of a given polarity of said A.C. voltage, the second switch being open when the first switch is closed.

9. The converter of claim 8, further comprising a controllable current source that provides a constant current.

10. The converter of claim 8, wherein the second switch is connected between the node and the reference terminal.

11. The converter of claim 8, wherein the first capacitor is connected to the node via a first diode.

12. The converter of claim 8, wherein the third capacitor is connected via a third diode to the reference terminal.

13. The converter of claim 12, wherein a second diode is connected between the second capacitor and a junction point of the third capacitor and the third diode.

14. The converter of claim 8, further comprising a first D.C. voltage across the first capacitor, wherein the control circuit controls the first switch so that the first D.C. voltage across the first capacitor is substantially constant.

15. The converter of claim 14, further comprising a second D.C. voltage of opposite polarity, wherein the second D.C. voltage of opposite polarity is across the second capacitor.

16. The converter of claim 8, wherein the first switch is controlled by voltage or current to be turned off or on and being able to block the main voltage forwardly or in reverse when the first switch is not controlled to the on state.

17. The converter of claim 8, wherein the first switch is a one-way switch.

18. A method for converting an A.C. voltage into a D.C. voltage, the method comprising the steps of:
   connecting a third capacitor in parallel with a first capacitor between a node and a reference terminal;
   connecting a second capacitor in series with the third capacitor;
   connecting an input terminal and the node of the converter during a first portion and a second portion of a halfwave of a given polarity of said A.C. voltage; and
   disconnecting a second capacitor in series with the third capacitor when the input terminal is connected to the node of the converter.

19. The method of claim 18, the method further comprising:
   providing a controllable current source that provides a constant current.

20. The method of claim 18, the method further comprising:
   connecting the first capacitor to the node via a first diode.

21. The method of claim 20, the method further comprising:
   charging the first capacitor during the first portion and the second portion of the halfwave.

22. The method of claim 18, the method further comprising:
   connecting the third capacitor to the reference terminal via a third diode.

23. The method of claim 22, the method further comprising:
   charging the third capacitor during the first portion and the second portion of the halfwave.

24. The method of claim 22, the method further comprising:
   maintaining a voltage across the third capacitor when the input terminal is disconnected from the node of the converter and when the node of the converter is disconnected from the reference terminal.

25. The method of claim 22, the method further comprising:
   connecting a second diode between the second capacitor and a junction point of the third capacitor and the third diode.

26. The method of claim 25, the method further comprising:
   charging the second capacitor when the input terminal is disconnected from the node of the converter and when the node of the converter is connected to the reference terminal.

27. The method of claim 18, the method further comprising:
   controlling the connection between an input terminal and the node of the converter so that a D.C. voltage across the first capacitor is substantially constant.

28. The method of claim 18, the method further comprising:
controlling the connection between the input terminal and the node of the converter by voltage or current to be turned off or on; and
blocking the main voltage forwardly or in reverse when the connection between the input terminal and the node of the converter is not controlled to the on state.

* * * * *